United States Patent [19]
Arnson

[11] Patent Number: 4,727,977
[45] Date of Patent: Mar. 1, 1988

[54] COVER FOR A GRAIN CONVEYOR HOPPER

[76] Inventor: Robert S. Arnson, Rte. 2, Box 46D, Williston, N. Dak. 58801

[21] Appl. No.: 897,213

[22] Filed: Aug. 18, 1986

[51] Int. Cl.[4] .............................................. B65G 47/18
[52] U.S. Cl. .............................. 198/550.01; 198/860.5
[58] Field of Search ...................... 198/311, 550.1, 548, 198/860.4, 860.5, 550.01, 550.2, 550.11, 550.12, 550.13; 414/141, 326, 526, 158, 190, 197, 213; 119/51 FS, 51 CF, 52 AF, 52 B

[56] References Cited
U.S. PATENT DOCUMENTS

| | | | |
|---|---|---|---|
| 2,166,040 | 7/1939 | Clark | 198/550.1 |
| 2,204,317 | 6/1940 | Mosshart | 414/197 |
| 2,644,574 | 7/1953 | Mercier | 198/160.5 |
| 3,163,280 | 12/1964 | Haugland | 198/548 |
| 3,215,257 | 11/1965 | Albers | 198/180.2 |
| 4,036,411 | 7/1977 | Westhoff | 198/550.1 |
| 4,090,604 | 5/1978 | Reifert | 198/861 |
| 4,573,567 | 3/1986 | Swinderman | 198/860.4 |

Primary Examiner—Joseph E. Valenza
Attorney, Agent, or Firm—Zarley, McKee, Thomte, Voorhees & Sease

[57] ABSTRACT

A cover is described which is adapted to be positioned over the hopper of a grain conveyor during the periods that the grain conveyor is not being used. The cover comprises a flat member having the same general shape, but larger, than the upper end of the hopper. The upper end of the cover is removably secured to the grain auger just above the hopper by means of a sleeve which is wrapped around and secured to the grain auger. The lower end of the cover is removably attached to the lower end of the hopper by a strap. When the cover is positioned over the hopper, rain water is prevented from entering the interior of the hopper.

1 Claim, 6 Drawing Figures

4,727,977

COVER FOR A GRAIN CONVEYOR HOPPER

BACKGROUND OF THE INVENTION

Grain conveyors are commonly used to convey grain from a truck or the like to the interior of a grain storage facility such as a granary or the like. Perhaps the most widely used type of grain conveyor is the conveyor which is commonly referred to as a grain auger. Grain augers normally consist of a wheeled frame means having an inclined tube mounted thereon. A helical screw conveyor is rotatably mounted within the tube and has an exposed lower end which pulls or conveys the grain into the interior thereof for discharge from the upper end thereof.

Many types of hoppers have been provided on the lower ends of the grain augers for directing grain to the intake end of the grain auger. Rain water frequently enters the interior of the hopper, between uses, which not only spoils the grain left therein but which also can damage the lower end of the grain auger.

It is therefore a principal object of the invention to provide a removable cover for a grain conveyor hopper.

Still another object of the invention is to provide a cover for a grain conveyor hopper wherein the cover is comprised of a rubber-like material.

Still another object of the invention is to provide a cover for a grain conveyor hopper which prevents the entry of rain water into the hopper during the periods that the grain conveyor is not being used.

Still another object of the invention is to provide a cover for a grain conveyor hopper which may be mounted on the grain conveyor and hopper without extensive modification thereof.

Yet another object of the invention is to provide a cover for a grain conveyor hopper which is easily mounted on the hopper and easily removed therefrom.

Still another object of the invention is to provide a cover for a grain conveyor hopper which is economical of manufacture, durable in use and refined in appearance.

These and other objects will be apparent to those skilled in the art.

SUMMARY OF THE INVENTION

Figure 1:
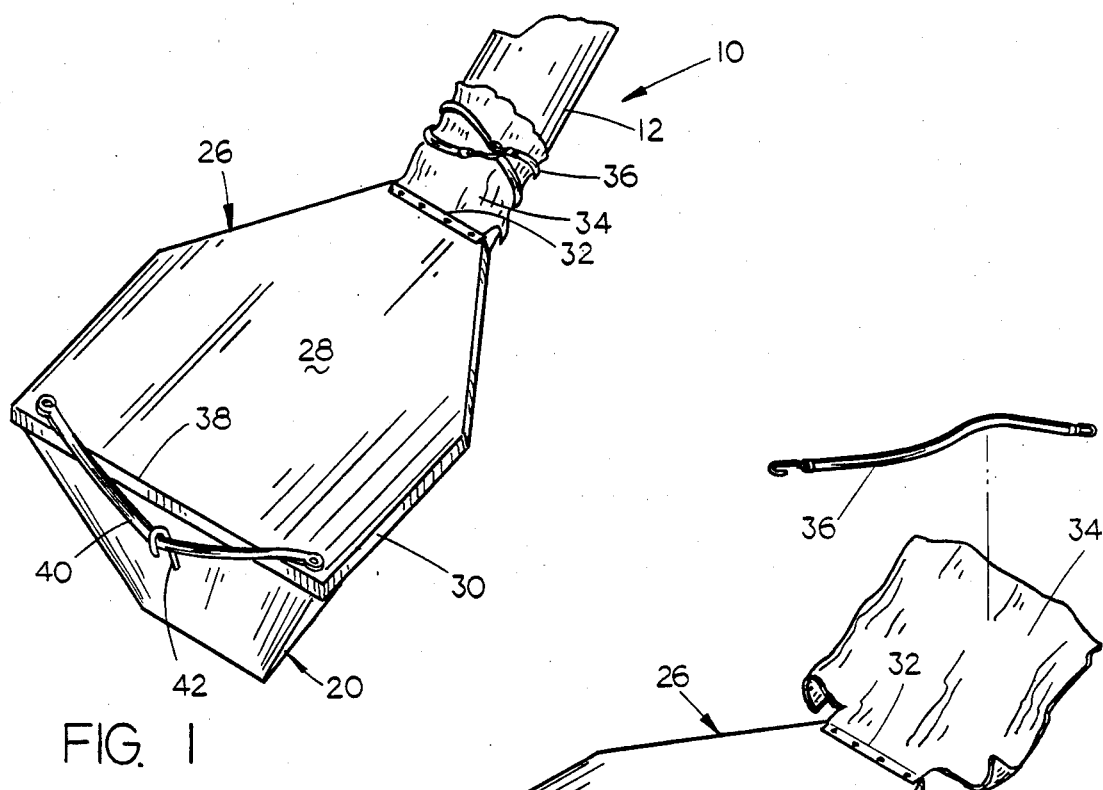
FIG. 1 is a perspective view of the cover of this invention mounted on a hopper which is secured to a grain auger.
Figure 2:
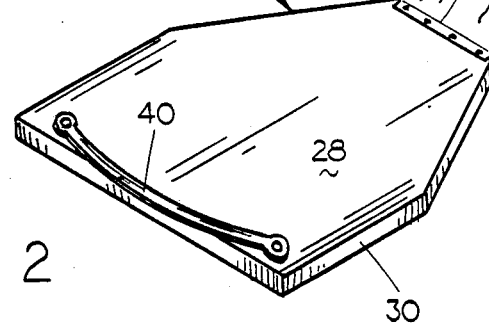
FIG. 2 is a perspective view of the cover of this invention.
Figure 3:
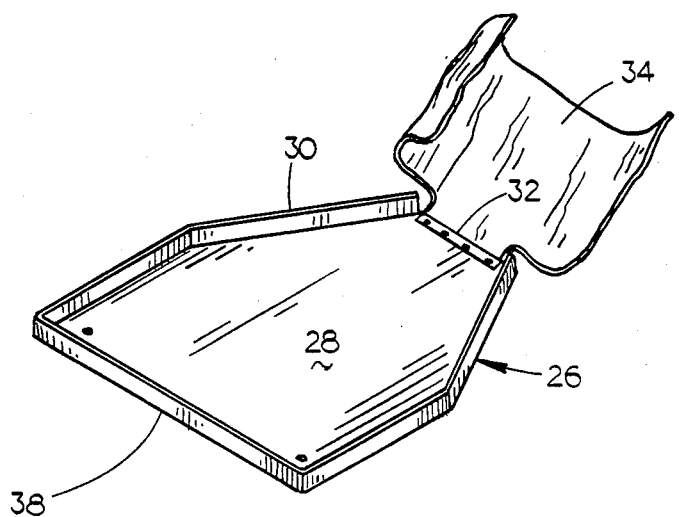
FIG. 3 is a perspective view of the botton of the cover of this invention.
Figure 4:
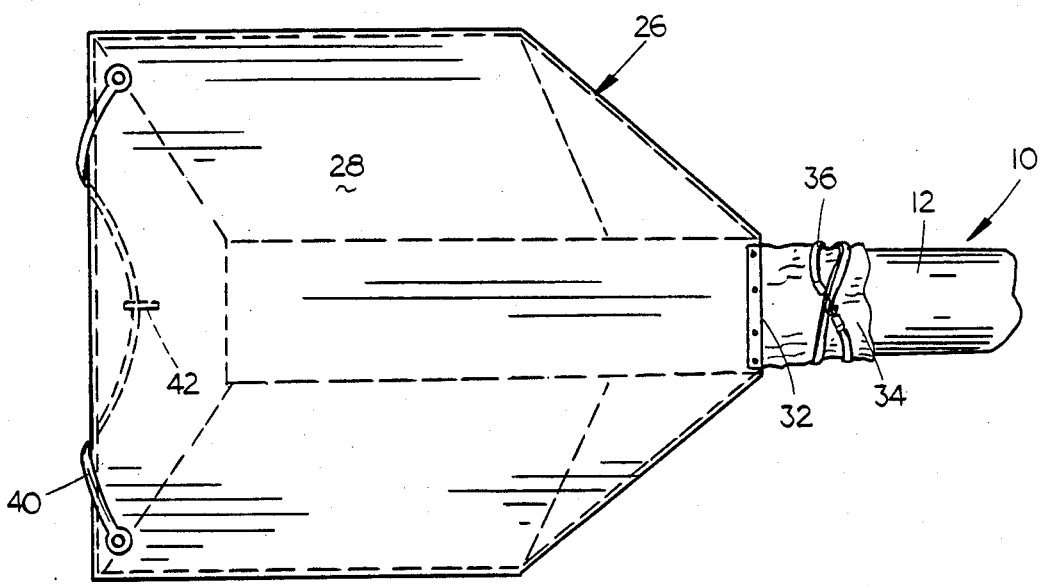
FIG. 4 is a top elevational view of the cover mounted on a hopper.
Figure 5:
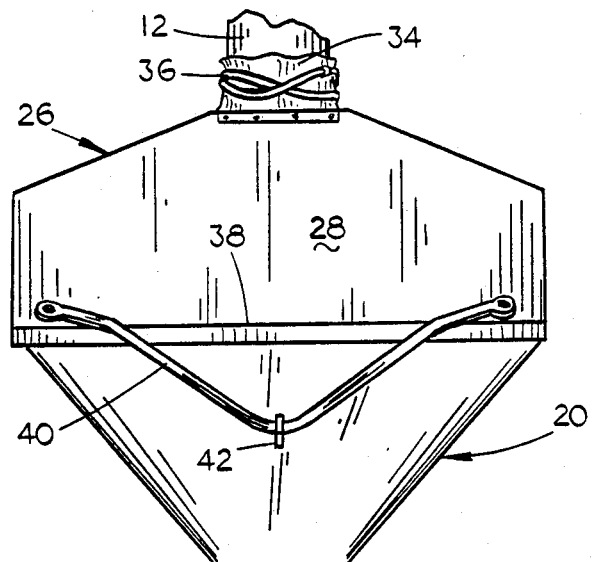
FIG. 5 is an end view of the cover mounted on a hopper.
Figure 6:
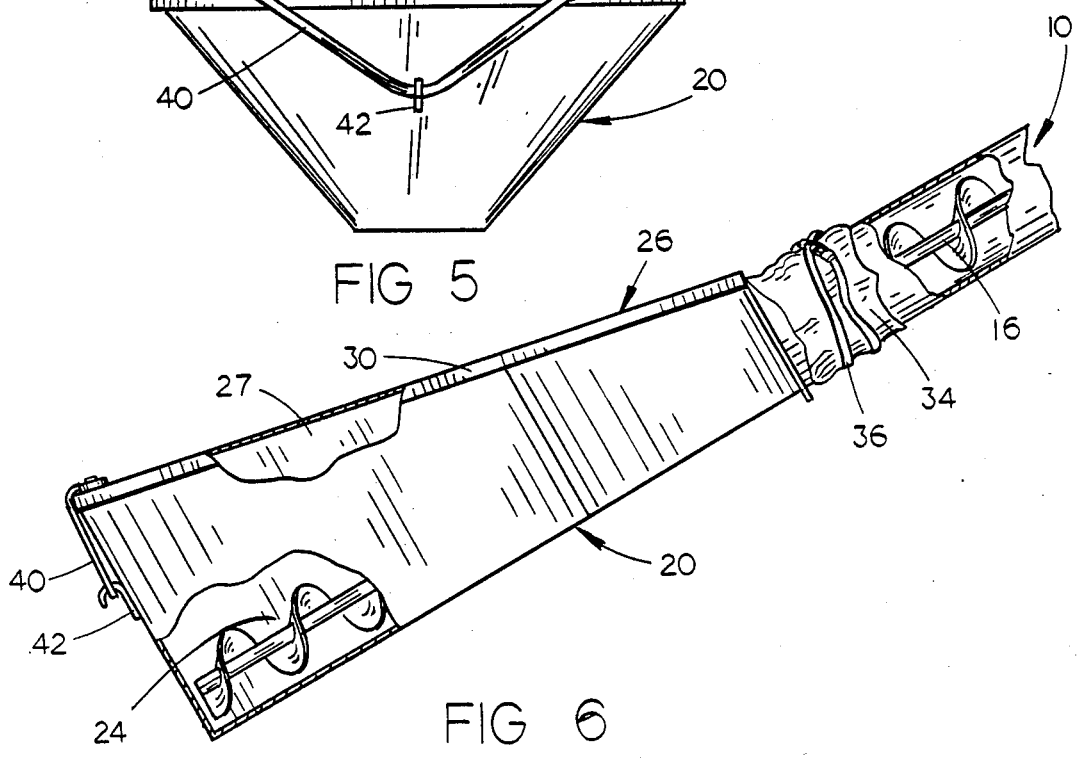
FIG. 6 is a side view of the cover mounted on a hopper with portions thereof cut away to more fully illustrate the invention.

A cover for a grain conveyor hopper is described for preventing rain water from entering the interior of the hopper. The hopper is mounted on the lower end of an inclined grain auger and is designed to direct grain to the intake end of the grain auger. The cover of this invention has the same general shape, but larger, as the upper end of the hopper. A first connection means in the form of a flexible sleeve secures the upper end of the cover to the grain auger tube just above the hopper. The cover may be positioned over the hopper and securely mounted thereon by means of a second connection means which secures the lower end of the cover to the hopper. When the cover is positioned over the hopper, rain water cannot enter the interior of the hopper so that damage to the grain and the grain auger is prevented.

DESCRIPTION OF THE PREFERRED EMBODIMENT

The numeral 10 refers generally to a conventional grain auger comprising an inclined tube 12 which is mounted on a conventional wheeled frame means which is designed to raise and lower the upper end of the grain auger. Positioned within the tube 12 is a helical screw conveyor 16 or helicoid. The lower end of the helicoid 16 is normally exposed so that grain may enter the interior of the tube 12 when the helicoid 16 is rotated. Grain auger 10 also includes a discharge means 18 at its upper end.

The numeral 20 refers generally to a hopper which is mounted on the lower end of the grain auger and which has an open upper end 22. For purposes of description, hopper 20 will be described as having an interior 24 which is in communication with the exposed portion of the lower end of the helicoid 16 to direct grain thereto. The problem associated with hoppers such as hopper 20 is that rain water enters the interior of the hopper, between uses, and can cause the grain in the hopper to spoil. A further problem associated with the hopper is that the rain water which collects therein can damage the lower end of the grain auger.

The cover of this invention is referred to generally by the reference numeral 26 and comprises a flat member 28 which has the same general shape as the open upper end 22 of hopper 20 but which is slightly larger so that its edges are positioned outwardly of the hopper 20. As seen in the drawings, flat member 28 is provided with a downwardly protruding lip portion 30 at its outer edges. The upper end 32 of flat member 28 is secured to tube 12 above hopper 20 by means of a flexible sleeve means 34 which is wrapped around tube 12 and secured thereto by means of a strap 36. The lower end 38 of flat member 28 is removably secured to hopper 20 by means of strap 40 attached to hook 42 as illustrated. Preferably, flat member 28 is comprised of a rubber-like material so that the same will not rust.

During the periods when the grain auger 10 is not being used, the cover 26 will be mounted over the open upper end 22 of hopper 20 as illustrated in FIG. 1. Strap 36 securely attaches the upper end of the cover on the tube 12 to prevent rain water from running down tube 12 into the interior of the hopper. Strap 40 securely maintains the lower end of cover 26 on the hopper 20 to prevent water from entering the interior of the hopper.

When it is desired to use the grain auger 10, strap 40 is disconnected, strap 36 is removed, and cover 26 is removed from the hopper. The grain auger may then be used in conventional fashion. When it is desired to again close the upper end of hopper 20, cover 26 is replaced on the hopper and the straps 36 and 40 are secured.

It can therefore be seen that a novel cover has been provided for a grain auger hopper which prevents rain water from entering the interior of the hopper during periods that the grain auger is not being used. The cover may be easily mounted on the hopper without extensive modification of either the grain auger or the hopper. It can therefore be seen that the invention accomplishes at least all of its stated objectives.

I claim:
1. In combination,
an inclined grain conveyor means having upper and lower ends,
said grain conveyor means having a grain discharge means at its upper end,
said grain conveyor means having a grain intake means at its lower end,
a hopper means mounted on the lower end of said grain conveyor means having an open upper end, and an interior portion in communication with said grain intake means,
and a hopper cover means mounted on said hopper means for selectively closing the open upper end of said hopper means, when said conveyor means is not being utilized to convey grain, for preventing rain water from entering the interior of said hopper means,
said cover means having the same general shape as the upper end of said hopper means,
said cover means having upper and lower ends, first connection means for pivotally securing the upper end of said cover means to said grain conveyor means, and second connection means selectively securing the lower end of said cover means to said hopper means,
said first connection means comprising a flexible sleeve means connected to the upper end of said cover means, said sleeve means being wrapped around said grain conveyor means above said hopper means for preventing rain from running down said grain conveyor means into the interior of said hopper means.

* * * * *